United States Patent [19]

McCormick

[11] 3,979,088
[45] Sept. 7, 1976

[54] ROCKET CATAPULT

[75] Inventor: Joseph B. McCormick, Willingboro, N.J.

[73] Assignee: The United States of America as represented by the Secretary of the Army, Washington, D.C.

[22] Filed: Sept. 26, 1975

[21] Appl. No.: 617,208

[52] U.S. Cl. .................. 244/122 AB; 244/122 AD
[51] Int. Cl.² ...................................... B64D 25/10
[58] Field of Search ............... 244/122 AD, 122 AB, 244/141, 122 AC, 122 A; 89/1.816, 1.819

[56] References Cited
UNITED STATES PATENTS
3,735,948  5/1973  MacDonald et al. ........... 244/122 A Primary Examiner—George E. A. Halvosa
Assistant Examiner—Barry L. Kelmachter
Attorney, Agent, or Firm—Nathan Edelberg

[57] ABSTRACT

A rocket catapult ejection system for a seat-occupant mass of a disabled aircraft in which the rocket motor has an annular nozzle throat defined by a spherical pintle and an adjustable nozzle housing. Axial adjustment of the nozzle housing will displace the centroid of the nozzle throat and adjust the rocket thrust vector to compensate for deviations in the occupant-seat mass center of gravity.

6 Claims, 5 Drawing Figures

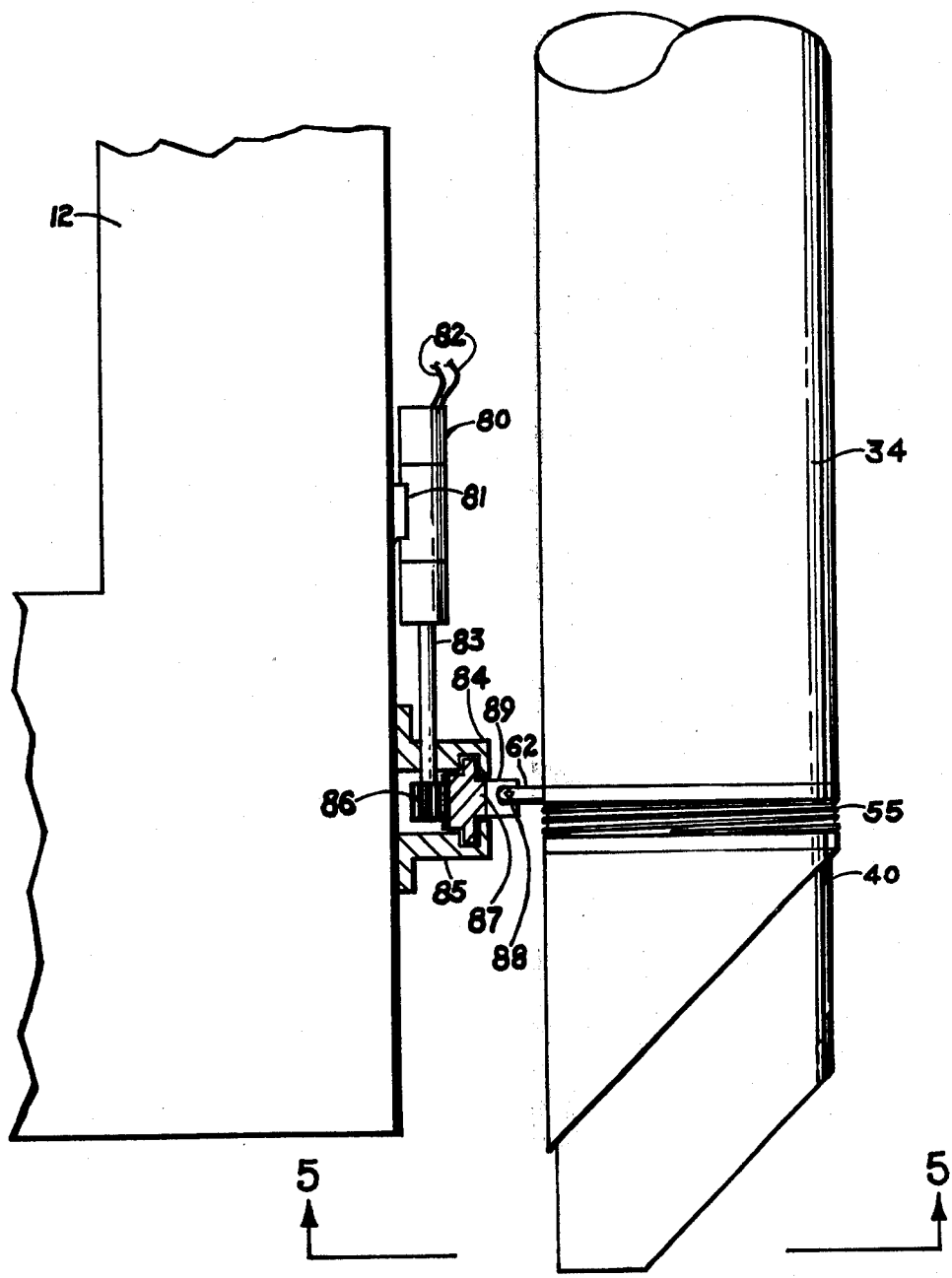

ROCKET CATAPULT

The invention described herein may be manufactured, used and licensed by or for the Government for governmental purposes without the payment to me of any royalty thereon.

This invention relates to rocket catapults, and more particularly to a rocket catapult emergency ejection system for a seat-occupant mass of a disabled aircraft.

One of the objects of the invention is to provide a rocket catapult aircraft ejection arrangement having an adjustable annular rocket nozzle to selectively adjust the rocket thrust vector.

Another object of the invention is to provide such an arrangement which is of simple and compact construction.

A further object of the invention is to provide such an arrangement having a minimum of seals and nozzle erosion.

These and other objects, features and advantages will become more apparent from the following description and accompanying drawings in which:

FIG. 4 is an elevational view, partially broken away, of a ring rotating mechanism associated with the FIG. 1 arrangement, certain parts being omitted and others shown in section.

Figure 1:
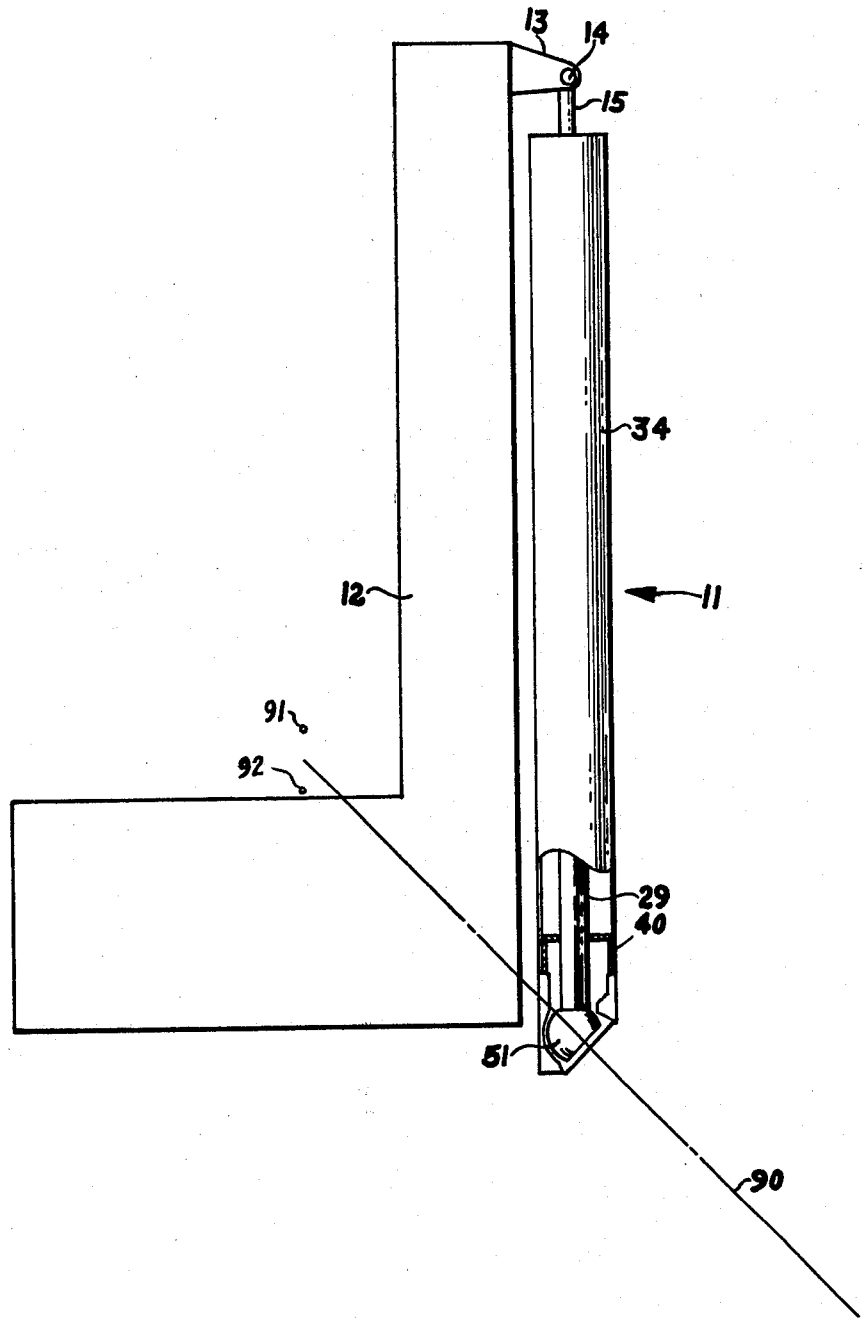
FIG. 1 is an elevational view, partially broken away in section with certain parts omitted of a rocket catapult and ejection seat arrangement embodying the principles of the invention.
Figure 2:
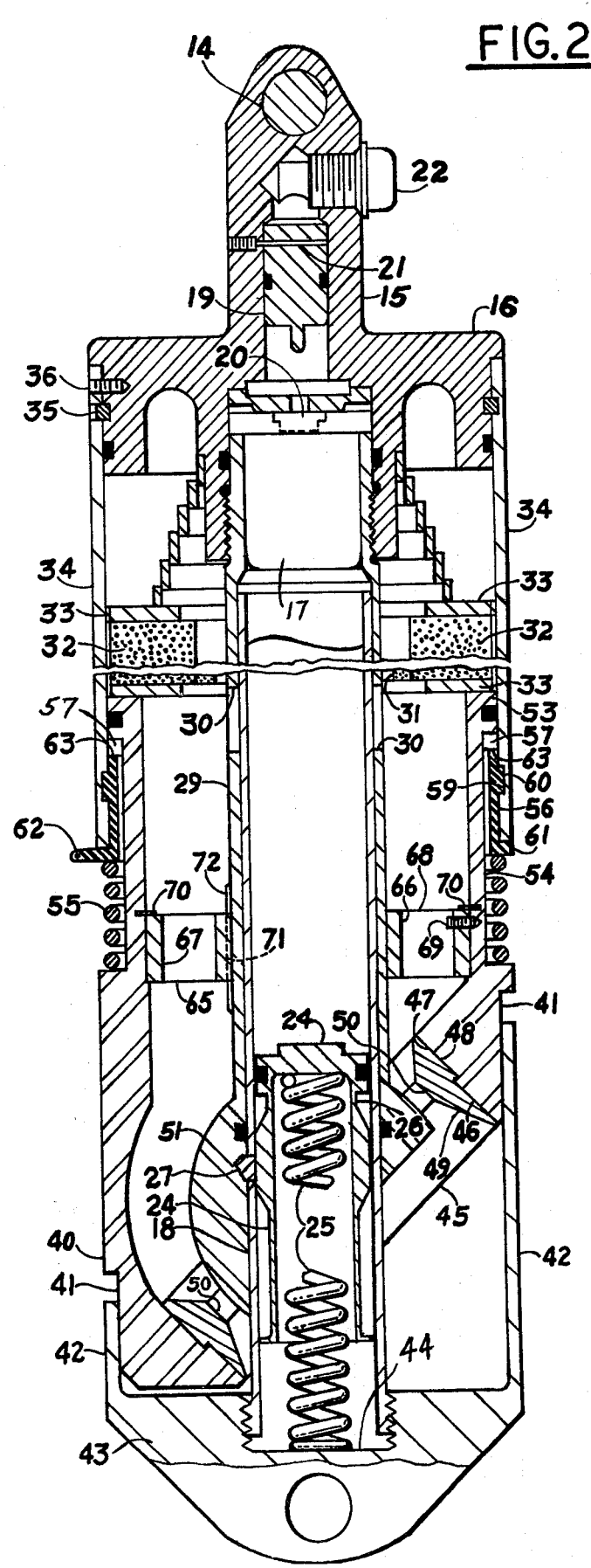
FIG. 2 is an enlarged longitudinal sectional view of the rocket catapult in the FIG. 1 arrangement.

The rocket catapult emergency ejection arrangement shown generally at 11 (FIG. 1), for seat-occupant mass escapement from a disabled aircraft prior to parachute deployment, includes a seat structure 12 having a pair of laterally spaced apertured lugs 13 appropriately secured to the seat back. The rocket mounting pin 14 (FIGS. 1, 2) is suitably secured to the lugs 13 to firmly mount the reduced portion 15 of the rocket catapult head member 16.

A booster propellant cartridge 17, centrally seated in the head member 16 and extending into the upper end of catapult or booster tube 18 which is suitably secured to the aircraft, is ignited when firing pin 19 strikes a primer 20 upon shearing of anchoring pin 21 by pressure gas from a gas initiator 22 or the like which is actuated by the occupant desiring emergency ejection from the aircraft. The propellant gas generated by cartridge 17 will move piston 24 downwardly, against the force of its internal compression spring 25, enabling the piston annular peripheral recess 26 to accommodate or release the three circumferentially spaced locking pins 27 that initially prevented longitudinal motion of the rocket motor guide tube 29 (which is threadedly secured to head member 16) relative to catapult tube 18. The release of locking pins 27 permit the generated cartridge propellant gas to launch the catapult phase separation of the rocket motor from the catapult tube 18. When the guide tube lateral openings 30 are uncovered, upon upward movement of the telescoping guide tube 29 on catapult tube 18, the cartridge propellant gas passes through openings 30 to ignite the cylindrical auxillary igniter 31 which extends along an inner surface portion of and ignites the cylindrical rocket propellant grain 32. The rocket grain is positioned between a pair of inhibitor annular members 33 within the rocket tube 34 that is secured to head member 16 by a suitable lock wire 35 and pin 36 arrangement.

The lower end portion 41 of substantially cylindrical nozzle housing 40 has a reduced peripheral diameter to be slidingly received by a mating tubular upper portion 42 of member 43 that attaches the rocket catapult to an aircraft by an appropriate trunnion means or the like. The base of tubular portion 42 has a centrally tapped recess 44 by which the catapult tube 18 is secured to the aircraft and in which the piston spring 25 is seated.

Figure 3:
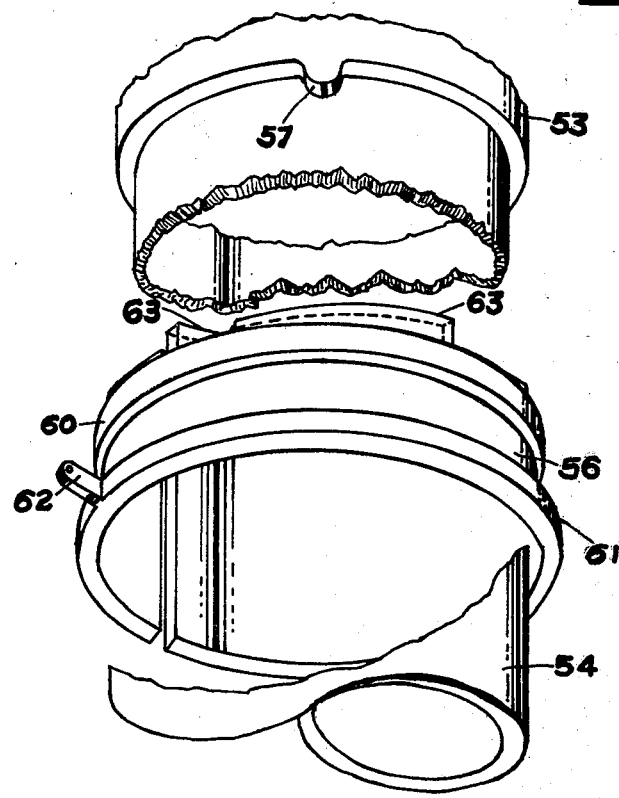
FIG. 3 is an enlarged perspective view of the nozzle housing camming means in the FIG. 2 rocket catapult.

Nozzle housing lower end portion 41 includes an inclined apertured wall 45, the circular aperture wall portion 46 having a substantially annular recess 47 at its innermost surface to seat the protruding annulus 48 of tubular nozzle insert 49. The throat defining portion 50 of nozzle insert 49 cooperates with a spherical segmental portion of the guide tube lower end spherical pintle 51 to define an annular nozzle throat through which propellant gas generated by the burning rocket grain exhaust during the rocket or sustainer phase of propulsion. The upper end portion 53 (FIGS. 2, 3) of nozzle housing 40 has a reduced external diameter to be slidable within rocket tube 34 and has a circumferential recess 54 that accommodates cam spring 55 and split cylindrical bushing or ring 56 for a purpose to be described. The upper end of recess 54 is partially defined by a pair of diametrically opposed, downwardly extending identical lugs or cam followers 57, 57.

The lower end of rocket tube 34 has an annular groove 59 in its internal surface for rotatably mounting the split bushing 56. The external surface of the split bushing 56 has a pair of longitudinally spaced, outwardly extending annular ribs 60, 61. Rib 60 seats in groove 59 and the lower rib 61 is positioned intermediate the lower end surface of the rocket tube 34 and compression spring 55. Rib 61 has integral therewith a laterally extending, apertured attachment lug 62 for a purpose to be described. The upper end of split bushing 56 has a pair of diametrically opposed, identical camming surfaces 63 of predetermined contour and which are biased upwardly by spring 55 to maintain contact with the cam followers 57.

A support spider 65, having a pair of concentric rings 66, 67 integrally connected by a plurality of radial arms 68, is secured to the internal surface of the nozzle housing by set screw 69 and a snap ring 70 that suitably fits into an annular groove in the nozzle housing internal surface and secures the spider 65 against a small inwardly extending shoulder formed on the nozzle housing inner surface. The internal surface on inner ring 66 of the spider has an appropriate longitudinally extending key way or slot 71 which slidingly receives the longitudinal rib or key 72 provided on the outer surface of guide tube 29. Thus, unitary movement of nozzle housing 40 and spider 65 is limited by key 72 to longitudinal motion relative to guide tube 29 and rocket tube 34 to the extent the cam followers 57 are adjusted upon rotation of split bushing 56 prior to actuation of initiator 22.

Figure 5:
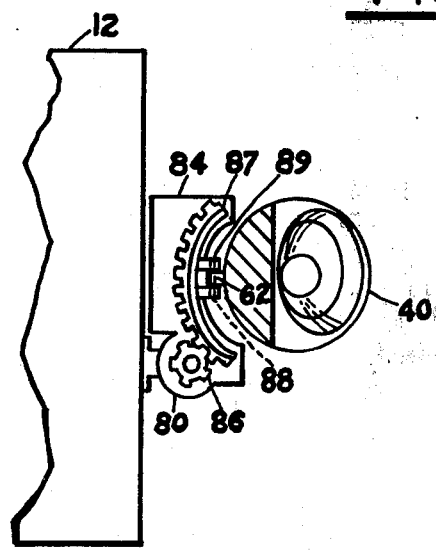
FIG. 5 is a sectional view taken along line 5—5 of FIG. 4, with the mechanism lower gears support omitted.

An actuator reversible electric motor 80 (FIGS. 4, 5), secured to a lower back portion of seat 12 by an appropriate mounting bracket 81 and electrically connected by electric wires 82 to a suitable motor control device (not shown) operated by the occupant, has its drive shaft 83 suitably journalled in the upper one of a pair of vertically spaced gear support members 84, 85 that are appropriately secured to the seat back below the motor 80. A rack and pinion mechanism for rotating split ring or bushing 56 includes pinion 86, which is secured to the lower end of drive shaft 83, and matingly engaged with rack or segmental gear 87 between the gear support members 84, 85. The apertured attachment lug 62, which cams the rocket nozzle housing 40 to an adjusted position, is connected by a suitable pin 88 to the bifurcated arms of clevis 89 which is integral with a central portion of rack or segmental gear 87.

By adjusting the longitudinally movable nozzle housing 40, the throat defining portions 50, 51 can be moved relative to each other upon actuation of reversible electric motor 80. As a result, the center line of thrust or rocket thrust vector 90 (FIG. 1), which passes through the centroid of the effective nozzle throat area, is moved accordingly to be selectively redirected through a predetermined different seat-occupant mass center of gravity located within the available range between points 91 and 92.

Various modifications, alterations or changes may be resorted to without departing from the scope of the invention as set forth in the appended claims.

I claim:

1. In a rocket catapult ejection system for a seat-occupant mass of an aircraft having a catapult tube secured to said aircraft and rocket motor means having a head member at one end attached to an aircraft seat structure,
    a guide tube secured at one end to said head member, slidably mounted on said catapult tube, and having a spherical pintle at its other end,
    a booster cartridge seated in said head member and extending into said catapult tube,
    releasable locking pin means initially securing said guide tube and catapult tube against relative longitudinal motion,
    a control piston in said catapult tube and responsive to ignition of said booster cartridge for releasing said locking pin means,
    a rocket tube secured at one end to said head member, surrounding and concentrically spaced from said guide tube, and housing a main rocket propellant grain,
    a nozzle housing having a reduced portion slidably mounted in said rocket tube and an inclined throat member surrounding a portion of said spherical pintle to define an annular nozzle effective throat therebetween for providing a thrust vector of generated rocket gases at a predetermined angle inclination to the longitudinal axis of said guide tube. and in alignment with a predetermined seat occupant mass center of gravity,
    means biasing said nozzle housing away from said rocket tube, and
    means for adjustably camming said nozzle housing to a desired position along the longitudinal axis of said guide tube in opposition to said biasing means,
    so constructed and arranged that said rocket thrust vector can be adjusted for deviations in said seat occupant mass center of gravity.

2. The structure in accordance with claim 1 wherein said camming means includes a split cylindrical bushing rotatably mounted in said rocket tube and having at one end thereof camming surface means, and said nozzle housing having cam follower means in contact with said camming surface means.

3. The structure of claim 2 wherein said split bushing has a pair of longitudinally spaced, outwardly extending annular ribs, and said rocket tube having an internal surface containing a laterally extending annular groove, one of said annular ribs extending into said annular groove and the other annular rib extending outwardly between said rocket tube and said biasing means.

4. The structure of claim 3 wherein a support spider is secured to and movable with said nozzle housing, said spider being keyed to said guide tube to preclude relative rotational motion between said spider and said guide tube.

5. The structure of claim 3 wherein said biasing means is a compression spring surrounding a portion of said nozzle housing reduced portion.

6. The structure of claim 5 wherein a drive mechanism is mounted on said seat structure and connected to said bushing other annular rib for rotating said bushing.

* * * * *